United States Patent Office 3,582,514
Patented June 1, 1971

3,582,514
COMPOSITIONS OF PHENOL FORMALDEHYDE RESINS AND PHENOL POLYMERS OF ISOPRENE AND PROCESS FOR THE ADDITION THERETO OF ETHYLENE-PROPYLENE POLYMERS
Anthony C. Soldatos, Kendall Park, N.J., assignor to Union Carbide Corporation
No Drawing. Continuation-in-part of application Ser. No. 718,225, Apr. 2, 1968. This application Oct. 31, 1968, Ser. No. 772,422
Int. Cl. C08f 45/34; C08g 37/18
U.S. Cl. 260—33.4
25 Claims

ABSTRACT OF THE DISCLOSURE

This invention relates to compositions of phenolformaldehyde resins and phenolated polymers of isoprene which, when added to ethylene-propylene polymers provide compositions which develop tack in a relatively short period of time and thus are excellently suited for use in the production of automobile tires and other energy absorbing rubber products on a commercial scale.

---

This application is a continuation in part of my copending application Ser. No. 718,225 filed Apr. 2, 1968.

This invention relates to compositions of phenol-formaldehyde resins and phenolated polymers of isoprene and to a process for the addition thereof to ethylene-propylene polymers. More particularly, this invention relates to compositions based on phenol-formaldehyde resins in admixture with phenolated polymers of isoprene which, when added to ethylene-propylene polymers, provide compositions which develop tack in a relatively short period of time and thus are excellently suited for use in the production of automobile tires and other energy absorbing rubber products on a commercial scale.

It has been found that the tack of ethylene-propylene polymers can be significantly improved by the addition thereto of polymeric phenolic tackifiers, as for example, phenolated polymers of isoprene. Development of a significant degree of tack in such compositions, however, requires that these compositions be aged for a period of hours, as a rule, under controlled conditions of temperature and humidity. As an illustration, a composition containing five percent by weight of a polymer of isoprene phenolated with p-dodecylphenol (identified subsequently in this application as Polymer B) based on the weight of an ethylene-propylene polymer, generally requires an ageing period of about 96 hours at a temperature of 75° F. while under a relative humidity of 12 percent, in order to achieve a degree of tack wherein strips produced therefrom and subjected to the Test for Tack (described in detail subsequently in this application) are non-separable.

It has also been found that by subjecting ethylene-propylene compositions, containing a polymeric phenolic tackifier as described, to ionizing radiation, non-ionizing radiation or electric discharge, the tack of these compositions can be significantly improved without any special regard for conditions of temperature and relative-humidity.

Although the tack of ethylene-propylene polymers, containing polymeric phenolic tackifiers, can be significantly improved by subjecting such compositions to ionizing radiation, non-ionizing radiation or electrc discharge, the greatest degree of improvement in the shortest period of time is effected utilizing an electric discharge. In order to treat a composition with an electric discharge, relatively expensive apparatus must be obtained, kept on hand and maintained in order. Consequently, the buying and maintaining of such apparatus can add to the cost, in some cases, of the overall operation of improving the tack of ethylene-propylene polymers.

The present invention provides for significantly improving the tack of ethylene-propylene polymers in a relatively short period of time without the necessity of utilizing relatively expensive apparatus.

The improvement in tack of ethylene-propylene polymers, in accordance with the present invention, is effected by adding to these polymers a composition comprising a mixture of a phenol-formaldehyde resin and a phenolated polymer of isoprene wherein the mixture of the phenol-formaldehyde resin and phenolated polymer of isoprene is present in an amount sufficient to improve the tack thereof generally in an amount of at least about one percent by weight, and as a rule, about 3 to about 100 percent by weight based on the weight of the ethylene-propylene polymers. Particularly effective results are achieved using about 5 percent by weight to about 20 percent by weight of the mixture, based on the weight of the ethylene-propylene polymers. In the mixture itself the phenolated polymer of isoprene is present in an amount of about 10 percent by weight to about 90 percent by weight and preferably about 20 percent by weight to about 75 percent by weight based on the combined weight of the phenol-formaldehyde resin and the phenolated polymer of isoprene.

On adding a mixture of a phenol-formaldehyde resin and phenolated polymer of isoprene to the ethlylene-propylene polymers and subjecting the resultant compositions to a common source of light, namely fluorescent light, significant improvement in the tack of the ethylene-propylene polymers can be effected in a period of time as short as 2 hours.

Illustrative polymers of isoprene which can be phenolated and used in accordance with this invention are homopolymers of isoprene which generally have a number average molecular weight of about 500 to about 30,000, preferably a number average molecular weight of about 500 to about 10,000 and more preferably have a number average molecular weight of about 1,000 to about 8,000; and which contain less than about 50 percent by weight and preferably less than about 20 percent by weight internal unsaturation (based on the weight of the total unsaturation).

Number average molecular weight was determined by Vapor Phase Osmometry.

Total unsaturation was determined by Wijs method (modified by correcting for substitution reactions).

Internal unsaturation was determined by Nuclear Magnetic Resonance and Infra-Red Analysis.

Internal unsaturation as used herein refers to unsaturated units which make up the backbone of the polymer as opposed to pendant unsaturated units.

For instance, internal unsaturation with respect to polyisoprene refers to the percent by weight of the diene units of isoprene (2-methyl butadiene-1,3) which have combined at the 1,4 position as opposed to the 1,2 and 3,4 positions.

1,4- position

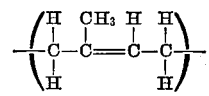

1,2- position

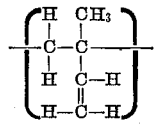

3,4- position

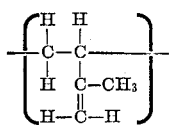

It is to be understood that homopolymers of isoprene as used herein are intended to include halogenated, hydrogenated and other like homopolymers of isoprene.

Preparation of polymers of isoprene, particularly homopolymers of isoprene, having the number average molecular weight and the unsaturation previously described can be conducted as described in this application and also as described in the following articles.

Quarterly Review, vol. 16, page 361–1962, "Stereo Regular Addition Polymerization" C. F. H. Bawan and A. Ledwith.

Journal of Polymer Science, vol 3, pages 2223–28, 1965. "Solvent Effects in Anionic Copolymerization Reactivity of Dienes," F. F. O'Driscoll.

Journal of Polymer Science, vol. 27—1957, "Polymerization of Isoprene with Lithium Dispersions and Lithium Alkyls using Tetrahydrofuran as Solvent," Henry Hsieh, D. J. Kelly, A. V. Tobolsky.

Journal of Polymer Science, vol. 40, pages 73–89, 1959. "Isoprene Polymerization by Organometallic Compounds," A. V. Tobolsky, C. E. Rogers.

Among other suitable polymers of isoprene are those obtained by polymerizing isoprene with one or more of a compound having at least one olefinic double bond to obtain a copolymer or interpolymer having the number average molecular weight and the internal unsaturation previously defined and containing at least about 30 percent by weight combined isoprene. Exemplary of suitable monomers having at least one olefinic double bond are described subsequently in this application. These polymers can be hydrogenated, halogenated and the like are previously described.

Among suitable phenols which can be used to phenolate the polymers of isoprene are those compounds which have the formula:

FORMULA I

R$-$(OH)$-$n wherein R is an aromatic hydrocarbon radical generally containing a maximum of 31 carbon atoms and preferably containing a maximum of 21 carbon atmos and $n$ is an integer having a value of 1 to 3 inclusive.

Especially desirable phenols are those having the formula:

FORMULA II

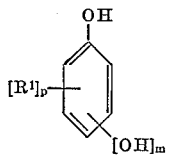

wherein each $R^1$, which can be the same or different, is an alkyl radical generally containing a maximum of 25 carbon atoms and preferably containing a maximum of 15 carbon atoms, an alkoxy radical generally containing a maximum of 25 carbon atoms and preferably containing a maximum of 15 carbon atoms, a cycloaliphatic radical generally containing a maximum of 25 carbon atoms and preferably containing a maximum of 12 carbon atoms, nitro, thio, or halogen, i.e., chlorine, bromine, fluorine or iodine; $p$ is an integer having a value of 0 to 5 inclusive, $m$ is an integer having a value of 0 to 3 inclusive and the maximum sum of $p+m=5$.

Illustrative of suitable phenols are the following: phenol, nitrophenol, thiophenol, alkylated phenols such as m-cresol, o-ethylphenol, methylphenol, p-isopropylphenol, p-tertbutylphenol, o-amylphenol, p-hexylphenol, p-nonylphenol, p-octylphenol, o-nonylphenol, p-dodecylphenol, o-dodecylphenol, 2,6-di-nonylphenol, 2,4-diethylphenol, 2,4-di-hexylphenol, 2,4-dinonylphenol, 2,4-didodecylphenol, 2,3,5-triethylphenol, 2,3,5-trihexylphenol, 2,3,4-triheptylphenol, 2,3,4,5-tetra-hexylphenol and other like phenols as well as the commercially available meta-cresol which contains small amounts of both the para and the ortho isomers; alkoxylated phenols, exemplary of which are m - methoxyphenol, o - methoxyphenol, p - methoxyphenol, m - hexoxyphenol, o - hexoxyphenol, p - hexoxyphenol, 2,4-dimethoxyphenol, 2,4-dihexoxyphenol, 2,3,4-trimethoxyphenol, 2,3,5-tri-hexoxyphenol, 2,3,4,5-tetrahexoxyphenol and the like; halogenated phenols such as ortho, meta or para bromo phenol, 2,4-dichlorophenol, 2,3,5-trichlorophenol, 3-chloro-4-methylphenol, 4-bromo-6-ethoxyphenol and the like; styrylphenol, cymylphenol, α-methylstyrylphenol and the like; polyhydric phenols such as pyrocatechol, hydroquinone, resorcinol and the like; alkylated dihydroxy phenols such as 1,3-dihydroxy-4-methylbenzene, 1,2 - dihydroxy - 4 - hexylbenzene and the like; alkoxylated dihydroxy phenols such as 1,4-dihydroxy-3-hexoxybenzene and the like; cycloaliphatic phenols such as p-cyclopentylphenol, p-cyclohexylphenol and the like; halogenated dihydroxy phenols such as 1,2-dihydroxy-4-chlorobenzene and the like; tri-hydric phenols such as phloroglucinol, pyrogallol and the like; polynuclear phenols such as 2,2-bis(p-hydroxyphenol)-propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Pat. 3,177,166, issued Apr. 6, 1965, to J. T. Gregory et al.

The phenol-formaldehyde resins which are used in conjunction with the phenolated polymers of isoprene are produced by reacting a phenol, preferably an alkylated phenol with formaldehyde in the presence of an acid or alkaline catalyst, as for example, sulfuric acid, oxalic acid and sodium hydroxide. Among suitable phenols are the alkylated phenols of Formula II wherein $R^1$ preferably has 4 to 25 carbon atoms inclusive. These phenols are further described in U.S. Pat. 3,294,866.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

$$R^2-CH=CH_2$$

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, propyl, hexyl, 2-ethylhexyl and the like; aromatic radicals such as phenyl, naphthyl and the like; cycloaliphatic radicals such as cyclohexyl, n-propylcyclohexyl and the like.

Methods for preparing copolymers of ethylene-propylene and the interpolymers of ethylene-propylene and a mono-olefinic compound are described in detail in U.S. Pat. 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Pats. 3,000,866 to R. E. Tarney and 3,211,709 to S. Adamek et al.

Especially desirable diene monomers are hexadiene, 1,4-dicyclopentadiene, ethylidenebicycloheptene and the like.

In formulating the ethylene-propylene compositions, the tackifier (mixture of phenol-formaldehyde resin and phenolated polymer) are dissolved in a petroleum oil such as naphthenic oil and thereafter added to the ethylene-propylene polymers in an internal mixer such as a Brabender mixer of a Banbury mixer. As a rule, the solids content of the petroleum oil solution is about 25 percent by weight to about 75 percent by weight. Also, it is preferred to heat the petroleum oil to a temperature of about 75° C. to about 150° C. in order to facilitate mixing prior to dissolving the tackifier therein. The sequence of addition of the tackifier to the petroleum oil is not critical. That is, the phenol-formaldehyde and phenolated polymer of isoprene can be dissolved in the petroleum oil in any desired order or can be added as a mixture.

To the ultimate ethylene-propylene compositions, can be added pigments, fillers, lubricants, plasticizers, curing agents, accelerators, stabilizers, antioxidants, rubbers such as butadiene-1,3-acrylonitrile, styrene-butadiene and other rubbers as are described in U.S. Pat. 2,962,457. In those instances wherein other rubbers are added, to a maximum amount of about 50 percent by weight based on the total weight of ethylene-propylene polymers and rubber additives, the amount of the mixture of a phenol-formaldehyde resin and phenolated polymer of isoprene is based on the combined weight of rubber and ethylene-propylene polymer. Other specific additives are pigments such as carbon black and clay; lubricants such as stearic acid and plasticizers such as naphthenic oils.

In those instances wherein the compositions of this invention contain a polymer of ethylene-propylene which is devoid of olefinic unsaturation for instance, a copolymer of ethylene and propylene, or an interpolymer of ethylene-propylene and a mono-olefinic compound, the compositions can be cured to elastomeric products using an organic peroxide such as dicumyl peroxide. In those instances wherein the polymer of ethylene-propylene contains olefinic unsaturation such as an interpolymer of ethylene-propylene and hexadiene-1,4, the compositions can be cured to elastomeric products using sulfur.

The amount of curing agent, the length of the curing cycle and the temperautre thereof will depend, in each instance upon the exact formulation of the compositions, as for example, is described in U.S. Pat. 3,200,174 and also as described in this application.

It is to be understood that the disclosure of all patents and literature references are incorporated herein by reference.

In order to demonstrate the excellent "tack" effected by the compositions of this invention, various ethylene-propylene compositions were formulated, formed into strips—one inch by six inches by ⅛ of an inch, and subjected to fluorescent light.

The test for tack was carried out by pressing two such strips together using a two-pound roller and then manually pulling the strips apart. "Tack" was judged on the basis of the difficulty encountered in attempting to manually separate the strips.

The various polymers used in formulating the compositions were prepared as follows:

Preparation of Polymer A—Polyisoprene

Into a two-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gram portions over a period of one hour. During the addition of the isoprene, the temperature of the reaction mixture was maintained at 50° C.–55° C. After the addition of the isoprene, the reaction mixture was maintained at a temperature of 60° C. for 2 hours while being constantly stirred. Methanol was added to the mixture and the product polyisoprene was recovered as the methanol insoluble portion of the mixture. The polyisoprene was stabilized by adding thereto 0.05 gram of 2,6-di-t-butyl-4-methylphenol and then dried by being placed in a vacuum oven for 18 hours. The vacuum oven was at a temperature of 40° C. and was operating under a pressure of 5 mm. Hg.

Analysis:

Number average molecular weight—2000
Percent internal unsaturation—5
Yield—116 grams of a viscous liquid Prepaartion of Polymer B—Phenolated polyisoprene Into a two-liter flask equipped with a stirrer and reflux condenser, there was charged 602 grams of p-dodecyl phenol and 40 grams of polyisoprene (Polymer A). To this mixture there was then added 10.4 grams of p-toluene sulfonic acid and the reaction mixture heated to a temperature of about 80° C. and maintained at this temperature for seven hours while under a nitrogen gas atmosphere. After this seven hour period, the reaction mixture was allowed to stand for 24 hours at a temperature of about 30° C. The phenolated polyisoprene was recovered as described with respect to Polymer A.

Analysis:

Number average molecular weight—2700
Melting point—87° C.–92° C.
Percent by weight combined p-dodecyl phenol—23 based on the total weight of the isoprene polymer
Percent internal unsaturation—5

Preparation of Polymer C—Phenolated polyisoprene

Into a two-liter flask equipped with a stirrer and reflux condenser, there was charged 520 grams of p-nonyl phenol and 40 grams of polyisoprene (Polymer A). To this mixture there was then added 10.4 grams of p-toluene sulfonic acid and the reaction then carried out in a manner described for Polymer B.

Analysis:

Number average molecular weight—2600
Melting point—87° C.–92° C.
Percent by weight combined p-dodecyl phenol—23 based on the total weight of the isoprene polymer
Percent internal unsaturation—5

Preparation of Polymer D—Phenolated polyisoprene

Into a two-liter flask equipped with a stirrer and reflux condenser, there was charged 450 grams of phenol and 55 grams of polyisoprene (Polymer A). To this mixture there was then added 14.3 grams of p-toluene sulfonic acid and the reaction mixture was heated to a temperature of 100° C. and maintained at this temperature for 1 hour while under a nitrogen gas atmosphere. The reacted mixture was distilled to a pot temperature of 150° C. under a pressure of 28 mm. Hg.

Analysis:

Number average molecular weight—2500
Melting point—164° C.–168° C.
Percent by weight combined p-nonyl phenol—16 based on the total weight of the isoprene polymer
Percent internal unsaturation—4

Preparation of Polymer E—Phenolated polyisoprene

Into a two-liter flask equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for Polymer B.

Analysis:

Number average molecular weight—3400
Melting point—82° C.–84° C.
Percent by weight combined thiophenol—15 based on the total weight of the isoprene polymer
Percent internal unsaturation—15

The polyisoprene used in this example was a liquid product having a number average molecular weight of 3000 and having 15 percent internal unsaturation.

Preparation of Polymer F—Phenolated polyisoprene

Into a two-liter flask equipped with a stirrer and reflux condenser, there was charged 1500 grams of o-t-butylphenol and 136 grams of polyisoprene (Polymer A). To this mixture there was then added 16.4 grams of borontrifluoridephenol complex containing 23 percent by weight borontrifluoride and the reaction then carried out in a manner described for Polymer B.

Analysis:

Number average molecular weight—2400
Melting point—138° C.–141° C.
Percent by weight combined o-t-butylphenol—21 based on the total weight of the isoprene polymer
Percent internal unsaturation—5

Preparation of Polymer G—Phenolated polymer of isoprene and butadiene-1,4

Into a two-liter flask, equipped with an agitator and condenser, there was charged 1000 ml. of tetrahydrofuran which had been dried by being passed through a column of molecular sieves. To this solvent there was then added 0.130 mole of n-butyl lithium in 80 ml. of heptane and immediately thereafter a blend of 61 to 61 grams of isoprene-butadiene-1,3 was added to the contents of the flask over a 2 hour period. Prior to being charged into the flask, the blend of isoprene-butadiene-1,3 had been passed through a column of Al₂O₃. During the addition of the blend, the temperature of the contents of the flask was maintained at 0° C. and the system was continuously purged with nitrogen gas. After the addition of the blend, the temperature of the reaction mixture was raised to 60° C. and kept at 60° C. for a period of 2 hours. Methanol was then added to the flask and the copolymer of isoprene-butadiene-1,3, recovered as the methanol insoluble portion of the reacted mixture. The copolymer was stabilized with 0.05 gram of 2,6-di-t-butyl-4-methylphenol and then dried in a vacuum oven.

This copolymer was then phenolated with p-nonylphenol in a manner described for Polymer B.

Analysis:

Number average molecular weight—1600
Melting point—95° C.–105° C.
Percent by weight combined p-nonyl phenol—20 based on the total weight of the isoprene polymer
Internal unsaturation—10

Preparation of Polymer J—p-t-butylphenol-formaldehyde novolac resin

Into a two-liter reaction flask there was added 262 grams of p-dodecyl phenol and 0.2 gram of sulfuric acid (97 percent) added thereto. This mixture was heated to a temperature of 90° C. and then cooled to a temperature of 50° C. 75 grams of formaldehyde were then added, as a 40 percent aqueous solution and the temperature of the reaction mixture was raised to 100° C. This temperature was maintained for a period of about 1.5 hours during which time the reaction mixture was continuously stirred. The reaction flask was then evacuated to a pressure of 50 millimeters of mercury and the water present in the reaction mixture was distilled off until a reaction temperature of 130° C. had been attained. This temperature was maintained until the reaction mixture had attained a Ring and Ball melting point of 190° F. The dodecyl phenol-formaldehyde resin was then discharged from the flask.

Preparation of Polymer I—p-nonyl-phenol-formaldehyde novolac resin

The preparation of Polymer I was carried out according to the procedure described with respect to Polymer H using the same equivalent amount of p-nonylphenol, in lieu of p-dodecylphenol.

Preparation of Polymer J—p-t-butylphenol-formaldehyde novolac resin

The preparation of Polymer J was carried out according to the procedure described with respect to Polymer H using the same equivalent amounts of p-t-butylphenol in lieu of p-dodecylphenol.

Preparation of Polymer K—p-nonylphenol-formaldehyde resole—type resin

Into a still, there was charged 220 parts by weight p-nonylphenol and 162.3 Formalin (37 percent). To this mixture there was then added 17.8 parts by weight sodium hydroxide as a 25 percent by weight aqueous solution. The resultant solution was then refluxed for 3 hours. The contents of the still were cooled to about 90° C. and toluene was charged into the still in an amount equivalent to the amount of phenol originally introduced into the still. The solution which formed was cooled to about 70° C. and 6.86 ml. of sulfuric acid (97 percent) was added thereto. The solution was stirred for about 15 minutes and thereafter was allowed to stand for about 20 minutes. At the end of the 20 minutes period, the solution had separated into a bottom aqueous layer and a top organic layer. The aqueous layer was then drained from the organic layer. The organic layer was washed twice with water and completely dehydrated by being heated to a temperature of 120° C. under a pressure of 760 mm. of Hg. The dehydrated organic layer was heated to a temperature of 130° C. under a pressure of 50 mm. of Hg with the result that all of the toluene was distilled off. The resin which was recovered, once the toluene was removed, was then heated at a temperature of about 120° C. to about 130° C. under a pressure of about 45 mm. of Hg to about 50 mm. of Hg until the final resin product had a tripod flow at 120° C. of 125–135 seconds.

Preparation of Polymer L—phenol-formaldehyde resole resin

The preparation of Polymer L was carried out according to the procedure described with respect to Polymer K using the same equivalent amount of phenol in lieu of p-nonylphenol.

A masterbatch composition, the formulation of which is noted below, was compounded to a blend in a Banbury mixer.

| Masterbatch Composition I: | Parts by weight |
|---|---|
| Terpolymer of ethylene-propylene hexadiene-1,4 containing 50 percent by weight combined ethylene, 48 percent by weight combined propylene with the remainder being hexadiene-1,4 | 100 |
| Zinc oxide | 5 |
| Stearic acid | 1 |
| Carbon black | 80 |
| Naphthenic oil | 40 |
| Sulfur | 1.5 |
| Tetramethyl-thiuram monosulfide | 1.5 |
| 2-mercaptobenzothiazole | 0.75 |

To samples of the masterbatch compositions, were added various amounts of a mixture of a phenolated polymer of isoprene and phenol-formaldehyde resin and also a phenolated polymer and a phenol-formaldehyde resin per se.

The tackifier of this invention was prepared by heating naphthenic oil to a temperature of 75° C. and dissolving therein the phenolated polymers of isoprene and the phenol-formaldehyde resins in amounts indicated in Table I. The solids content of the solution was about 40 percent. The tackifiers, in the oil solution, were dispersed in the sample of the masterbatch by a milling operation in a Brabender which had been preheated to a temperature of 100–120° C. Each composition was sheeted on the two-roll mill and cut into strips, 1 inch by 6 inches by ⅛ inch. These strips were then treated as described in Table I and used in the tack test previously described.

The phenolated polymers of isoprene and the phenol-formaldehyde resins per se were blended with samples of Masterbatch Composition I in a Brabender mixer.

The results of the tests are shown in Table I.

The source of the fluorescent light of Table I was fluorescent lamps placed 7 feet from each specimen. The specimen or strips were subjected to the fluorescent light under ambient conditions of temperature and pressure. The actual fluorescent lamp used was a cool white, 40 watt fluorescent tube.

A second Masterbatch Composition was prepared which was identical to Masterbatch Composition I with the exception that in lieu of 100 parts by weight of the ethylene-propylene polymer, there were used 60 parts by weight of the ethylene-propylene polymer of Masterbatch Composition I and 40 parts by weight of styrene-butadiene-1,3 rubber. To samples of this Masterbatch Composition were added various tackifiers as noted in Table II. The samples were subjected to fluorescent light and tested for tack in a manner as described for the compositions of Table I. The results are noted in Table II.

Similar results are achieved using mixtures made up of Polymer C–G and I–L, in accordance with this invention.

TABLE I

| Tackifier | | Parts by weight tackifier [1] | Total time [2] (hours) |
|---|---|---|---|
| 1 | {Polymer B—50% by weight / Polymer H—50% by weight} | 4 | 60 |
| 2 | {Polymer B—25% by weight / Polymer H—75% by weight} | 4 | 80 |
| 3 | {Polymer B—50% by weight / Polymer H—50% by weight} | 7 | 2 |
| 4 | {Polymer B—25% by weight / Polymer H—75% by weight} | 7 | 3 |
| 5 | {Polymer B—87.5% by weight / Polymer H—12.5% by weight} | 7 | 6 |
| | Control 1—Polymer B | 4 | ([3]) |
| | Control 2—Polymer B | 7 | 30 |
| | Control 3—Polymer H | 4 | ([4]) |
| | Control 4—Polymer H | 7 | >100 |

[1] Based on 100 parts by weight ethylene-propylene polymer.
[2] Fluorescent light treatment for strips to become non-separable.
[3] After 100 hours the strips had not reached a non-separable condition.
[4] After 200 hours the strips had not reached a non-separable condition.

TABLE II

| Tackifier | | Parts by weight tackifier [1] | Total time [2] (hours) |
|---|---|---|---|
| 6 | {Polymer B—50% by weight / Polymer H—50% by weight} | 7 | 4 |
| | Control 5—Polymer B | 7 | ([3]) |
| | Control 6—Polymer H | 7 | ([4]) |

[1] Based on 100 parts by weight ethylene-propylene polymer.
[2] Fluorescent light treatment for strips to become non-separable.
[3] After 10 hours the strips had not reached a non-separable condition.
[4] After 15 hours the strips had not reached a non-separable condition.

What is claimed is:

1. A composition comprising an ethylene-propylene polymer which can be cured to an elastomeric product and, in an amount sufficient to improve the tack of said ethylene-propylene polymer, a mixture of a phenol-formaldehyde resin and a reaction product of a phenol having the formula $R(OH)_n$ wherein R is an aromatic hydrocarbon radical containing a maximum of 31 carbon atoms and $n$ is an integer having a value of 1 to 3 inclusive, and an isoprene polymer which is a
   (1) homopolymer of isoprene or
   (2) a polymer of isoprene and at least one monomer having at least one olefinic double bond, said polymer containing at least about thirty percent by weight combined isoprene wherein said isoprene polymer has a number average molecular weight of about 500 to about 30,000 and contains less than about 50 percent by weight internal unsaturation, said reaction product having a combined phenol content of about 5 to about 75 percent by weight and wherein the amount of said reaction product relative to said phenol-formaldehyde resin is about 10 percent to about 90 percent by weight based on the combined weight of said reaction product and said phenol-formaldehyde resin.

2. A composition as defined in claim 1 wherein said isoprene polymer has a number average molecular weight of about 1,000 to about 8,000 and contains less than about 20 percent by weight internal unsaturation.

3. A composition as defined in claim 1 wherein said phenol-formaldehyde resin is a novolac resin.

4. A composition as defined in claim 1 wherein said phenol-formaldehyde resin is a resole resin.

5. A composition as defined in claim 1 wherein the said reaction product is p-dodecylphenol phenolated polyisoprene.

6. A composition as defined in claim 1 wherein the said reaction product is p-nonylphenol phenolated polyisoprene.

7. A composition as defined in claim 1 wherein the said reaction product is phenol phenolated polyisoprene.

8. A composition as defined in claim 1 wherein the said reaction product is o-t-butylphenol phenolated polyisoprene.

9. A composition as defined in claim 1 wherein said reaction product is p-dodecylphenol phenolated polymer of isoprene and butadiene-1,3.

10. A composition as defined in claim 1 wherein the phenol-formaldehyde resin is a novolac resin of p-dodecylphenol and formaldehyde.

11. A composition as defined in claim 1 wherein the phenol-formaldehyde resin is a novolac resin of p-nonylphenol and formaldehyde.

12. A composition as defined in claim 1 wherein the phenol-formaldehyde resin is a novolac resin of p-t-butylphenol and formaldehyde.

13. A composition as defined in claim 1 wherein the phenol-formaldehyde resin is a resin of p-nonylphenol and formaldehyde.

14. A composition as defined in claim 1 wherein the phenol-formaldehyde resin is a resole resin of phenol and formaldehyde.

15. A composition as defined in claim 1 wherein the ethylene-propylene polymer is an ethylene-propylene-hexadiene polymer.

16. A composition as defined in claim 1 which contains a butadiene rubber.

17. Process for the preparation of a composition of an ethylene-propylene polymer which comprises adding thereto a petroleum oil solution of a mixture as defined in claim 1.

18. A composition as defined in claim 1 wherein said mixture is present in said composition in an amount of about 3 to about 100 percent by weight based on the weight of said ethylene-propylene polymer.

19. A composition as defined in claim 1 wherein said mixture is present in said composition in an amount of about 5 to about 20 percent by weight based on the weight of said ethylene-propylene polymer.

20. A composition as defined in claim 1 wherein said isoprene polymer has a number average molecular weight of about 500 to about 10,000 and contains less than about 50 percent by weight internal unsaturation.

21. A composition as defined in claim 1 wherein the isoprene polymer is a homopolymer of isoprene.

22. A composition as defined in claim 1 wherein the isoprene polymer is a polymer of isoprene and at least one monomer having at least one olefinic double bond, said polymer containing at least about 30 percent by weight combined isoprene.

23. A composition as defined in claim 1 wherein the ethylene-propylene polymer is a copolymer of ethylene and propylene.

24. A composition as defined in claim 1 wherein the ethylene-propylene polymer is an interpolymer of ethylene-propylene and a polymerizable monomer having at least one olefinic double bond.

25. A composition as defined in claim 1 wherein the ethylene-propylene polymer is a terpolymer of ethylene-propylene and a diene monomer.

References Cited
UNITED STATES PATENTS

| | | | |
|---|---|---|---|
| 3,256,368 | 6/1966 | Soldatos et al. | 260—848 |
| 3,294,866 | 12/1966 | Soldatos | 260—848 |
| 3,342,769 | 9/1967 | Souffie | 260—848 |
| 3,402,140 | 9/1968 | Bickel et al. | 260—848 |
| 3,476,642 | 11/1969 | Berg et al. | 260—848 |
| 3,491,167 | 1/1970 | Soldatos | 260—889 |

JOHN C. BLEUTGE, Primary Examiner

U.S. Cl. X.R.

260—33.6, 845, 846, 889

UNITED STATES PATENT OFFICE
CERTIFICATE OF CORRECTION

Patent No. 3,582,514  Dated June 1, 1971

Inventor(s) Anthony C. Soldatos

It is certified that error appears in the above-identified patent and that said Letters Patent are hereby corrected as shown below:

Column 3, line 38, "are" should read --as--; column 3, line 21, "F. F. O'Driscoll" should read --K. F. O'Driscoll--; column 3, line 47, "atmos" should read --atoms--. Column 4, line 74, "Pat." should read --Pats.--. Column 7, line 60, "Polymer J--p-t-butylphenol" should read --Polymer H--p-dodecylphenol--. Column 9, Table 1, lines 50-54

```
         ⎧ Polymer B
    5----⎨ Polymer H
         ⎩ Control 1
           Control 2
           Control 3
           Control 4
``` should read

```
    5----⎧ Polymer B
         ⎩ Polymer H
           Control 1
           Control 2
           Control 3
           Control 4
```

UNITED STATES PATENT OFFICE
CERTIFICATE OF CORRECTION

Patent No. 3,582,514      Dated June 1, 1971

Inventor(s) Anthony C. Soldatos      PAGE - 2

It is certified that error appears in the above-identified patent and that said Letters Patent are hereby corrected as shown below:

Column 9, Table II, lines 62-65

```
        ⎧ Polymer B
6 ----  ⎨ Polymer H
        ⎩ Control 5
          Control 6
``` should read

```
        ⎧ Polymer B
6 ----  ⎩ Polymer H
          Control 5
          Control 6
```

Signed and sealed this 26th day of October 1971.

(SEAL)
Attest:

EDWARD M. FLETCHER, JR.
Attesting Officer

ROBERT GOTTSCHALK
Acting Commissioner of Patents